United States Patent [19]

Wolf

[11] 3,894,876

[45] July 15, 1975

[54] PHOSPHONITRILIC ESTERS

[75] Inventor: Rainer Wolf, Allschwil, Switzerland

[73] Assignee: Sandoz Ltd., Basel, Switzerland

[22] Filed: Oct. 11, 1973

[21] Appl. No.: 405,477

Related U.S. Application Data

[63] Continuation-in-part of Ser. No. 98,854, Dec. 16, 1970, abandoned.

[52] U.S. Cl. ............ 106/15 FP; 260/45.9 R; 927 N; 252/8.1; 428/921; 117/161 UB
[51] Int. Cl. ............................................. C09d 5/18
[58] Field of Search ............ 117/136, 137, 138.8 B, 117/143 R, 144, 161 UB; 260/927 N

[56] References Cited
UNITED STATES PATENTS

| | | | |
|---|---|---|---|
| 2,681,295 | 7/1954 | Hamalainen | 117/137 |
| 2,825,718 | 3/1958 | Hamalainen | 117/137 X |

*Primary Examiner*—Ralph Husack
*Assistant Examiner*—Theodore G. Davis
*Attorney, Agent, or Firm*—Gerald D. Sharkin; Richard E. Vila; Joseph J. Borovian

[57] ABSTRACT

This invention relates to the use of new phosphonitrilic esters, obtainable by reaction of a phosphonitrilic halide with 2,2-bis(halomethyl)propane-1,3-diol or with 3-halo-2,2-bis-(halomethyl)-1-propanol, for the flameproof treatment of natural and/or synthetic materials.

10 Claims, No Drawings

PHOSPHONITRILIC ESTERS

This application is a continuation-in-part of our copending Ser. No. 98,854 filed Dec. 16, 1970 and now abandoned.

This invention relates to new phosphonitrilic esters, to a process for the production of these esters and to their use for flameproofing natural and/or synthetic materials including textiles consisting of natural and/or synthetic fibres.

These new phosphonitrilic esters have the following general formula

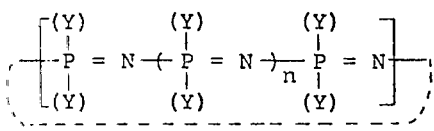   I where
n represents a whole number from 1 to 10, and
each Y represents a halogen atom or the radical

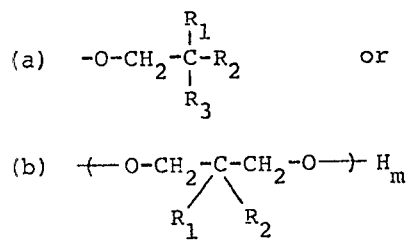

in which
the two free valencies are bound to the same phosphorus atom and form with it a ring or are bound to two different phosphorus atoms, to which formula (a) or (b), at least one Y in formula I, must conform,
$R_1$, $R_2$ and $R_3$, independently of each other, represent lower halogenated alkyl radicals, and
m represents zero or 1.

The phosphonitrilic esters of formula I can be produced by a process which is characterised by the reaction of a phosphonitrilic halide of formula $$P_qN_qHal_{2q}$$   II where
q represents a whole number from 3 to 12, and
Hal chlorine, bromine or fluorine,
with a propane-1,3-diol of formula

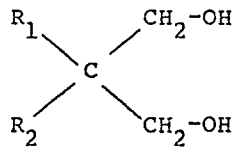   III or an alcohol of formula

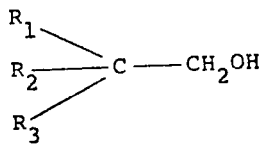   IV where
$R_1$, $R_2$ and $R_3$ have the meanings given in the foregoing significances, preferably in a molar ratio of 1:1 to 2 q respectively.

The phosphonitrilic halides may, for example, be the reaction products of ammonium halides and phosphopentahalides, preferably of $NH_4C$ and $PCl_5$. Generally the mixtures obtained directly on reaction can be used, or the fractions isolated from these mixtures, such as $P_3N_3Cl_6$, $P_4N_4Cl_8$ or $P_xN_xCl_{2x}$, where x is greater than 4.

An example of a suitable mixture is 60-70% $P_3N_3Cl_6$, 10-15% $P_4N_4Cl_8$ and the remainder $P_xN_xCl_{2x}$ (cf. French Pat. No. 1,281,571). The halogenated radicals $R_1$, $R_2$ and $R_3$ may be identical or different and may contain 1 to 5 carbon atoms; halogen may be fluorine, bromine or chlorine.

Suitable propane-1,3-diols of formula III thus include 2,2-bis-(chloromethyl)-propane-1,3-diol and 2,2-bis-(bromomethyl)-propane-1,3-diol:

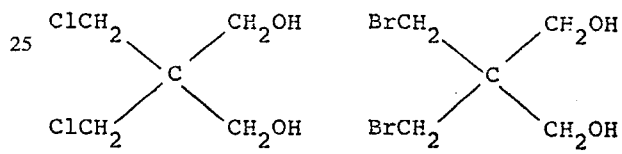

Examples of compounds of formula IV are 3-bromo-2,2-bis-(bromomethyl)-1-propanol and 3-chloro-2,2-bis-(chloromethyl)-1-propanol:

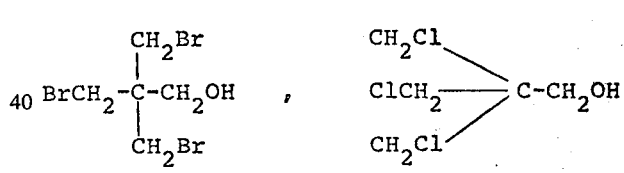

One mole of the compound $(PNHal_2)_q$ is reacted with 1 to 2 q moles, preferably 2 q moles, of the compound III or IV; an excess of the latter two compounds is not detrimental. It is best to react in an organic solvent which is inert to the phosphonitrilic halide and in the presence of an acid-binding agent which is likewise inert to the compounds in the mixture, in the temperature range of 0° to 200°C, preferably in the range of 20° to 100°C, and at excess or reduced pressure as necessary.

Alternatively, the reaction can be allowed to proceed at a relatively low temperature and the temperature increased in the final phase to complete the reaction.

Examples of suitable organic solvents are ethers such as dioxane, 1,2-dimethoxyethane, 1,2-diethoxyethane, 1-ethoxy-2-(2'-ethoxyethoxy)-ethane, tetrahydrofuran; aromatic hydrocarbons such as benzene, toluene, xylene, mesitylene; halogenated aliphatic or aromatic hydrocarbons such as chloroform, trichloroethylene, chlorobenzene, ortho-dichlorobenzene, bromobenzene; ketones such as propanone-2, butanone-2, 4-methyl-pentanone-2, 2,6-dimethyl-heptanone-4; and acetonitrile, dimethyl formamide, dimethyl acetamide, dimethyl sulphoxide, tetramethylene sulphone, phosphoric tris-(dimethylamide).

The following are examples of suitable acid-binding agents: hydroxides and carbonates of alkali metals such as potassium, sodium and lithium hydroxide and carbonate, hydroxides and carbonates of alkaline earth metals such as calcium, magnesium and barium hydroxide and carbonate; ammonium hydroxide and carbonate; quaternary ammonium hydroxides such as benzyl trimethyl, tribenzylmethyl and tetra-(lower alkyl)-ammonium hydroxide, tri-(lower alkyl)-amines such as triethylamine, tributylamine, trimethylamine; or preferably pyridine, picoline, quinoline etc.

If tertiary amines are used as acid-binding agents, they can serve additionally as solvents.

On completion of the reaction the product is precipitated, for example by dilution with a suitable agent, preferably water, if necessary with the addition of an acid, or with an alcohol such as methanol, ethanol or iso-propanol, filtered with suction and dried. Alternatively, the solvent can be removed by distillation, preferably under reduced pressure, and the residue extracted with a suitable agent such as methylene chloride or chloroform.

As will be apparent to one skilled in the art, the reaction between compounds of formula II and III will result in a mixed product since the diol may react either as a monofunctional or a bifunctional compound, and further, when reacting as a bifunctional compound, some of the residues of the diol are bound to a single phosphorus atom and some are bound to two different phosphorus atoms. Indeed, even when a compound of formula II is reacted with an alcohol of formula IV, as will also be apparent to the skilled man, a mixed product will in general result following the presence of mixed phosphoritrilic halides, mixed alcohols and/or differential replacement of the halogen atoms of the compound of formula II, the latter resulting not just in products having varying degrees of substitution, but in the case of multisubstituted products, also in position isomers. While separation of at least the major constituents of such products may, in some cases, be possible, as will be well appreciated by the skilled man, for use as flame-proofing agents, as described below, isolation of the various constituents of the mixed products is not necessary, and indeed, very satisfactory results are obtained by the use of such mixed products.

The halogenated phosphonitrilic esters obtained by the above described process are colourless, crystalline solids, well soluble in a variety of organic solvents. They are useful as flameproofing agents for textiles, plastics and synthetic resins. Thus, textiles finished with these products are self-extinguishing even after several washes at the boil under the conditions of the German Industrial Standards test 53906.

For the flameproofing of textile fibres or fabrics, they can be applied from aqueous suspension, aqueous-organic suspension or solution, or organic solution. Textile fabrics can be woven or non-woven, and made from natural or synthetic fibres, such as cotton, rayon, cellulose acetate or triacetate, polyester, polyamide, polyacrylonitrile, or polypropylene. The compounds have been found to be particularly useful for flameproofing fabrics made from blended fibres, such as polyester cotton blends, polyester rayon blends, polyamide cotton blends, polyacrylonitrile cotton blends, and others. Fibres can be blended in different weight ratios, for example in the case of polyester cotton blends the ratio can be 67 percent polyester and 33 percent cotton, or 50 percent polyester and 50 percent cotton, or 33 percent polyester and 67 percent cotton. However, fabrics with other blend ratios can also be successfully flameproofed.

To obtain better fixation of the compounds on the fibres or fabrics, a short thermal treatment after finishing is recommended. Temperatures applied depend on fabric type and can vary between 100° and 250°, preferably between 150° and 200°C. In many cases, an additional application of a N-methylol or N-methoxymethyl derivative, such as trimethylol melamine, tris(methoxymethyl) melamine dimethylol ethylene urea, dimethylol propylene urea, dimethylol dihydroxyethylene urea, bis(methoxymethyl) uron, or others, together with an acid salt-type catalyst, such as $(NH_4)_2SO_4$ or $NH_4Cl$, will improve durability of the flameproofing effect. This additional treatment can be applied separately in a different finishing step, or preferably together with the flameproofing finish in one single step.

The add-on of flameproofing compounds depends on fibre type and fabric construction, and on the degree of flame retardancy desired. In general, an add-on of 5 to 35 percent, preferably of 8 to 25 percent on the weight of the fabric is required. In case of a polyester cotton blended fabric (67:33), an add-on of about 12 percent of a phosphonitrilic ester, together with a methylol melamine derivative and an acid salt-type catalyst, gives a textile which is self-extinguishing even after several washes under the conditions of the German Industrial Standard 53 906. However, the same fabric requires an add-on of about 20 percent of the same phosphonitrilic derivative, together with the methylol melamine derivative and the catalyst, to pass the more severe U.S. Sleepwear Standard Doc FF 3-71. The amount of N-methylol or N-methoxymethyl derivative, if applied, is not critical, and can be 10 to 100 percent, preferably 30 to 70 percent, based on the weight of the phosphonitrilic ester. Also, the amount of the acid salt-type catalyst is not critical, and can be 2 to 20 percent, preferably 5 to 10 percent, based on the weight of the N-methylol or N-methoxymethyl derivative.

The phosphonitrilic esters described can also be incorporated into textile fibres by adding these compounds to spinning dopes prior to spinning procedure. Thus, for example, the compounds can be incorporated into fibres from regenerated cellulose, such as rayon, acetate or triacetate fibres. Again, the amount of compound added depends on fibre type and degree of flame retardancy desired. In general, amounts of 3 to 30 percent, preferably 5 to 20 percent, based on the weight of fibre material, are required.

The compounds are also suitable as flameproofing additives in plastics materials. They can be incorporated into a great variety of plastics, such as polyethylene, polypropylene, polyvinyl chloride, polystyrene, ABS-polymers, poly(methyl-methacrylate), polyesters, polyamides, rigid and flexible polyurethanes, polycarbonates, cellulose acetates, epoxy resins, or phenolic resins. Again, the amount of phosphonitrilic esters added depends on the type of plastic material and degree of flame retardancy required. In general, amounts of 2 to 30 percent, preferably 4 to 20 percent, based on the weight of plastic material, are required.

EXAMPLE 1

73.5 Parts of 2,2-bis-(chloromethyl)-propane-1,3-diol and 74 parts of pyridine are added consecutively to a solution of 49 parts of $P_3N_3Cl_6$ in 220 parts of tetrahydrofuran at 20°. The reaction mixture is stirred for 22 hours at room temperature and then for 12 hours with reflux, during which time pyridine hydrochloride is formed as a precipitate. The mixture is cooled, and filtered free of salt, after which the filtrate is poured into 1000 parts of water. The product precipitates as a white product which is isolated and dried.

The dry product has a melting range of 116°–120°. It is readily soluble in many organic solvents including aromatic and chlorinated hydrocarbons, acetone, ethyl acetate, tetrahydrofuran, dimethyl formamide, dimethyl acetamide, dimethyl sulphoxide and phosphoric tris-(dimethylamide).

EXAMPLE 2

150 Parts of 2,2-bis-(bromomethyl)-propane-1,3-diol and 110 parts of pyridine are added consecutively to a solution of 66 parts of $P_3N_3Cl_6$ in 300 parts of tetrahydrofuran at 20°. The reaction mixture is stirred for 2 days at room temperature and subsequently for 8 hours at 75°, on which pyridine hydrochloride precipitates. The mixture is cooled and filtered free from salt, then the filtrate is concentrated by evaporation until an oily residue is left. On the addition of 1000 parts of water the reaction product settles out as a yellowish precipitate. The product can be purified and obtained in an almost colourless state by reprecipitation with acetone/water.

Its melting range is about 200° to 220° and it is soluble in the solvents named in Example 1.

EXAMPLE 3

A solution of 116 parts of a mixture of oligomeric phosphonitrilic chlorides of the approximate composition 60–70% $P_3N_3Cl_6$, 10–15% $P_4N_4Cl_8$ and the remainder $P_xN_xCl_{2x}$, where $x$ is greater than 4, is dissolved at 20° in 600 parts of tetrahydrofuran. To this solution are added consecutively 265 parts of 2,2-bis-(bromomethyl)-propane-1,3-diol and 200 parts of pyridine. The reaction mixture is stirred for 2 days at room temperature and then for 8 hours at 75°; pyridine hydrochloride precipitates during the reaction. Subsequently the mixture is cooled and after being filtered free from salt it is poured into 1000 parts of water causing the reaction product to precipitate as a yellowish porduct. The product can be purified and obtained almost colourless by reprecipitation from an acetone/water mixture. Its softening range is 80°–90° and it is well soluble in many organic solvents such as aromatic and chlorinated hydrocarbons, ethyl acetate, tetrahydrofuran, dimethyl formamide, dimethyl acetamide, dimethyl sulphoxide and phosphoric tris-(dimethylamide).

EXAMPLE 4

A solution of 34.8 parts of trimeric phosphonitrilic chloride and 195 parts of 3-bromo-2,2-bis-(bromomethyl)-1-propanol in 210 parts of tetrahydrofuran is reacted by adding 52 parts of pyridine and stirring for 20 hours at room temperature and then for 20 hours with reflux. During the reaction pyridine hydrochloride precipitates. The solution is cooled, the pyridine hydrochloride filtered off and the tetrahydrofuran distilled. The oily product remaining is dissolved in acetone, precipitated in ethanol and filtered. From the filtrate one half of the introduced 3-bromo-2,2-bis(bromomethyl)-1-propanol was regained. The reaction product is a white solid with a softening range between 100°–120°, and does not melt up to 200°.

It is soluble in a variety of organic solvents such as acetone, dimethylformamide, dimethylacetamide, dimethylsulphoxide, tetrahydrofuran, dioxane, but is is not soluble in water and alcohols such as methanol, ethanol and isopropanol.

EXAMPLE 5

30 Parts of pyridine are added to a solution of 24.8 parts of trimeric phosphonitrilic chloride and 97.5 parts of 3-bromo-2,2-bis-(bromomethyl-1-propanol in 265 parts of tetrahydrofuran. The mixture is reacted with stirring for 5 hours at room temperature and then for 38 hours at 75°. During the reaction, pyridine hydrochloride precipitates. After cooling, the solution is filtered free of the pyridine hydrochloride and tetrahydrofuran is distilled off. The oily residue is dissolved in acetone, precipitated in methanol and filtered. No further starting material can be recovered from the filtrate. The reaction product is a white solid which softens at about 150° and has the same solubility properties as the product described in Example 1.

EXAMPLE 6

116 Parts of a mixture of oligomeric phosphonitrilic chlorides of the approximate composition 50 to 60% $P_3N_3Cl_6$, 10 to 15% $P_4N_4Cl_8$ and the remainder $P_xN_xCl_{2x}$ where $x$ is greater than 4, are dissolved at 20° in 265 parts of tetrahydrofuran. To this solution are added consecutively 262 parts of a crude technical mixture, containing 80 to 82 percent, 2,2-bis(bromomethyl)propane-1,3-diol and 11 to 15 percent 3-bromo-2,2-bis(bromomethyl)-1-propanol, and then 160 parts of pyridine. The reaction mixture is stirred for 17 hours at room temperature, then slowly heated to 70° to 75° and stirred at this temperature for an additional period of 16 hours. Pyridine hydrochloride precipitates during the reaction. Subsequently the mixture is cooled, and, after being filtered free from salt, tetrahydrofuran is distilled off under reduced pressure at 40° to 90°. The warm, oily residue is poured into 1000 parts of ice-water and the mixture stirred rigorously in a blender. The reaction product is precipitated as a white solid which is filtered off, washed with water and dried. The product has a softening range between 80° and 90° and is soluble in the solvents named in Example 3.

EXAMPLE 7

116 Parts of a mixture of oligomeric phosphonitrilic chlorides of the approximate composition named in Example 6 are dissolved in 350 parts of tetrahydrofuran. To this solution are added consecutively 325 parts of 3-bromo-2,2-bis(bromomethyl)-1-propanol and 100 parts of pyridine. The reaction mixture is stirred for 23 hours at room temperature and 23 hours at reflux. During the reaction, pyridine hydrochloride precipitates. The solution is cooled, pyridine hydrochloride filtered off, and tetrahydrofuran distilled under reduced pressure at 60°. The oily product remaining is dissolved in dimethyl formamide and the solution precipitated in isopropanol. The reaction product can be filtered off, washed with isopropanol and dried. It is a white solid with a softening range between 100° and 110°. It is soluble in acetone, dimethyl formamide, dimethyl acetamide, dimethylsulphoxide, dioxan, tetrahydrofuran, methylene chloride, chloroform, toluene and others. It is not or only little soluble in water, carbon tetrachloride, diethyl ether, or alcohols, such as methanol, ethanol, propanol or isopropanol.

EXAMPLE 8

A mixture of 140 parts of the product described in Example 3, 14 parts of sodium dinaphthyl-methane disulphonate ("Lyocol O", registered trade mark) and 246 parts of water was ground for 5 hours with ice cooling in a laboratory bead mill in the presence of 400 parts of quartzite beads. The resulting fine dispersion was passed through a glass frit to free it from the quartzite beads, diluted with 220 parts of water and set with 70 parts of methylol melamine derivative ("Lyofix CH", registered trade mark) and 7 parts of ammonium sulphate. The dispersion was padded on a cotton cretonne fabric (125 g/m$^2$) and on a 50:50 blend of fabric of polyester fibre and cotton (220 g/m$^2$) with a pick-up of 75 percent. The fabrics were dried for 6 minutes at 100° and then treated for a further 5 minutes at 160° for fixation of the finish.

Each fabric was washed 10 times for 30 minutes each time with a 5 g/l solution of a domestic detergent ("Dixan", registered trade mark), the cotton fabric at the boil, the blend fabric at 60°. After these repeated washes, the finished fabrics were submitted to the flammability test described in German Industrial Standard 53906 and found to be non-flammable. With both fabrics the loss of the tensile strength was less than 23–24 percent.

EXAMPLE 9

Three different fabrics, and namely cotton fabric, a 50:50 and a 67:33 blend of polyester (polyethylene terephthalate) fibre and cotton were each padded with an aqueous solution of 100 g/l trimethylol-melamine trimethylether and 10 g/l ammonium sulphate and dried for 6 minutes at 100°. The fabrics were then padded with a 200 g/l solution in trichloro-ethylene of one of the products described in Examples 4, 5 and 7, the liquor pick-up being about 85 percent of the dry weight, dried for 6 minutes at 100° and treated for 5 minutes at 160° for fixation of the finish.

The finished fabrics were washed 15 times for 30 minutes each time with a 5 g/l solution of a domestic detergent, the cotton fabric at the boil, the blend fabrics at 60°.

The finished, washed fabrics are non-flammable in the test referred to in the preceding Excample. Example.

The domestic detergent employed in the above Examples has the following composition:
20 percent sodium dodecylbenzenesulphonate
40 percent sodium tripolyphosphate
8 percent sodium silicate
1 percent sodium salt of carboxymethyl cellulose
21 percent sodium sulphate
10 percent moisture The sodium dedecylbenzenesulphonate can be wholly or partly replaced by an alkylsulphate, alkylpolyglycol ether sulphate, alkylphenylpolyglycolether sulphate or by a non-ionic detergent.

EXAMPLE 10

Three different fabrics, namely a 50:50 blend of polyester fibre and rayon fibre (fabric A, 111 g/m$^2$), a 67:33 blend of polyester fibre and cotton (fabric B, 165 g/m$^2$), and a 33:67 blend of polyester fibre and cotton (fabric C, 100 g/m$^2$) were each padded with a 300 g/l solution in 1,2-dichloro-ethane of the phosphonitrilic ester described in Example 3, the liquor pick-up being 80 percent of the dry weight, dried for 1.5 minutes at 100° and heated for 5 minutes at 160°. The fabrics were then padded with an aqueous solution of 150 g/l trimethoxymethylmelamine and 15 g/l (NH$_4$)$_2$SO$_4$, the liquor pick-up being again 80 percent, dried 1.5 minutes at 100° and heated 5 minutes at 160°. The finished fabrics were washed 20 times according to the method described in AATCC 124-1969 (at 60°) with the domestic detergent described in Example 9. Flammability was tested according to the U.S. Sleepwear Standard Doc-FF 3-71. Results are given in the Table below. Fabrics without treatment burned completely.

Table

| Fabric | Average char length (cm) | Residual Flame Time (sec) |
|---|---|---|
| A | 6.1 | 0 |
| B | 5.2 | 1 |
| C | 7.1 | 0 |

EXAMPLE 11

Five different fabrics, namely a cotton fabric (fabric A', 125 g/m$^2$), a 50:50 and a 67:33 blend of polyester (polyethylene terephthalate fibre and cotton (fabric B', 125 g/m$^2$, and fabric C', 165 g/m$^2$, respectively), a 50:50 blend of polyamide fibre and cotton (fabric D', 145 g/m$^2$), and a 50:50 blend of polyacrylonitrile fibre and cotton (fabric E', 183 g/m$^2$) were each padded with an aqueous solution of 100 g/l trimethoxymethylmelamine and 10 g/l ammonium sulphate and dried for 6 minutes at 100°. The fabrics were then padded with a 200 g/l solution in acetone or trichloro-ethylene of one of the products described in Examples 4, 5 and 7, the liquor pick-up being about 85 percent of the dry weight, dried for 6 minutes at 100° and treated for 5 minutes at 160° for fixation of the finish.

The finished fabrics were washed 15 times for 30 minutes each time with a 5 g/l solution of a domestic detergent as described in Example 9, the cotton fabric at the boil, the blend fabrics at 60°. The finished, washed fabrics are non-flammable in the test referred to in the preceding Example (see Table).

[Fabric specimens, except fabric A', were clipped to a sheet of thin glass-fibre mat before testing.]

Table

| Fabric | | Burning time (sec) | Charred or burned area (%) |
|---|---|---|---|
| A', | untreated | 15.0 | 100 |
| A', | treated with compound of Ex. 4 | 0 | 17 |
| A', | treated with compound | | |

Table-Continued

| | Fabric | Burning time (sec) | Charred or burned area (%) |
|---|---|---|---|
| | of Ex. 6 | 0 | 28 |
| B', | untreated | 39.9 | 100 |
| B', | treated with compound of Ex. 4 | 0 | 8 |
| B', | treated with compound of Ex. 6 | 0 | 10 |
| C', | untreated | 54.6 | 100 |
| C', | treated with compound of Ex. 4 | 0 | 5 |
| C', | treated with compound of Ex. 5 | 0 | 8 |
| C', | treated with compound of Ex. 6 | 0 | 8 |
| D', | untreated | 58.9 | 100 |
| D', | treated with compound of Ex. 6 | 0 | 8 |
| E', | untreated | 55.1 | 100 |
| E', | treated with compound of Ex. 6 | 0 | 0 |

EXAMPLE 12

4 Parts of the compound described in Example 3 were thoroughly mixed with 100 parts of a polypropylene powder (Propathen HM 20, registered trade mark) and roll-milled at 155° to form a sheet which was then pressed at 190° into a plate of 1 mm thickness. Flammability was tested according to the "LOI" procedure described by Fenimore and Martin (Mod. Plastics, November 1966). LOI of the plate was 26.1, compared to 18.6 of an equally prepared plate without additive.

EXAMPLE 13

10 Parts of the compound described in Example 3 were incorporated into 90 parts of a polyester-styrene prepolymer (Polylite 8170, registered trade mark) which was then polymerized with usual catalysts to form a plate of 1 mm thickness. The LOI-value of the plate was 27.7, compared to 19.0 of an equally prepared plate without additive.

What is claimed is:

1. A method of flameproofing plastics materials and textiles of natural, synthetic or blended natural-synthetic fibres, which comprises coating or incorporating in the material to be flameproofed, a phosphonitrilic ester of the general formula

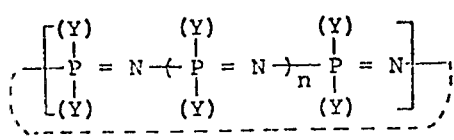

where $n$ is a whole number from 1 to 10; at least one Y is a radical

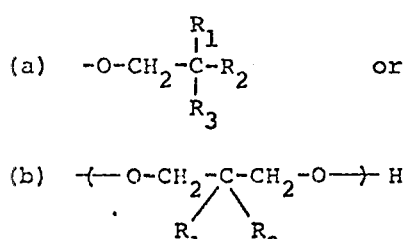

in which radical (b) $m$ is 0 or 1 and when $m$ is 0 the two free valencies are bound to the same phosphorus atom or are bound to two different phosphorus atoms, and each of the other Y's is halo or a radical (a) or (b); and $R_1$, $R_2$ and $R_3$, independently of each other, are monochloromethyl or monobromomethyl.

2. A method according to claim 1, wherein $R_1$ and $R_2$ are —$CH_2Cl$.

3. A method according to claim 1, wherein $R_1$ and $R_2$ are —$CH_2Br$.

4. A method according to claim 1, wherein $R_1$, $R_2$ and $R_3$ are —$CH_2Cl$.

5. A method according to claim 1, wherein $R_1$, $R_2$ and $R_3$ are —$CH_2Br$.

6. A method of flameproofing plastics materials and textiles of natural, synthetic or blended natural-synthetic fibres, which comprises coating or incorporating in the material to be flameproofed, a mixture of phosphonitrilic esters of the general formula

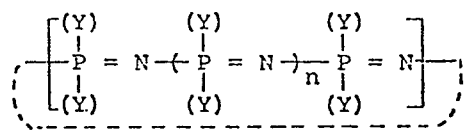

where $n$ is a whole number from 1 to 10; at least one Y is a radical

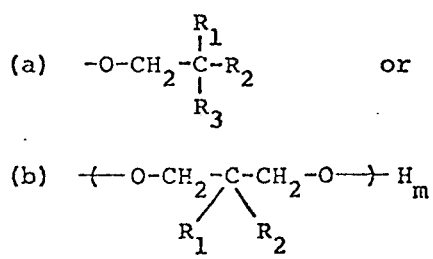

in which radical (b) $m$ is 0 or 1 and when $m$ is 0 the two free valencies are bound to the same phosphorus atom or are bound to two different phosphorus atoms, and each of the other Y's is halo or a radical (a) or (b); and $R_1$, $R_2$ and $R_3$, independently of each other, are monochloromethyl or monobromomethyl.

7. A method according to claim 6, wherein $R_1$ and $R_2$ are —$CH_2Cl$.

8. A method according to claim 6, wherein $R_1$ and $R_2$ are —$CH_2Br$.

9. A method according to claim 6, wherein $R_1$, $R_2$ and $R_3$ —$CH_2Cl$.

10. A method according to claim 6, wherein $R_1$, $R_2$ and $R_3$ are —$CH_2Br$.

* * * * *